(12) United States Patent
Khait et al.

(10) Patent No.: US 6,494,390 B1
(45) Date of Patent: Dec. 17, 2002

(54) SOLID STATE SHEAR PULVERIZATION OF MULTICOMPONENT POLYMERIC WASTE

(75) Inventors: Klementina Khait, Skokie, IL (US); Erin G. Riddick, Chicago, IL (US)

(73) Assignee: Northwestern University, Evanston, IL (US)

(*) Notice: Subject to any disclaimer, the term of this patent is extended or adjusted under 35 U.S.C. 154(b) by 0 days.

(21) Appl. No.: 09/635,673

(22) Filed: Aug. 10, 2000

Related U.S. Application Data (60) Provisional application No. 60/206,555, filed on May 24, 2000.

(51) Int. Cl.$^7$ ................................................ B02C 19/12
(52) U.S. Cl. .................................................. 241/23
(58) Field of Search .......................... 241/23, 65, 260.1

(56) References Cited

U.S. PATENT DOCUMENTS

| | | |
|---|---|---|
| 3,102,716 A | 9/1963 | Frenkel |
| 3,104,426 A | 9/1963 | Wellman |
| 3,161,437 A | 12/1964 | Le Tourneau |
| 3,342,901 A | 9/1967 | Kosinsky et al. |
| 3,525,124 A | 8/1970 | Ocker |
| 3,728,053 A | 4/1973 | Stillhard et al. |
| 3,814,566 A | 6/1974 | Stroup |
| 3,874,835 A | 4/1975 | Rossiter et al. |
| 3,889,889 A | 6/1975 | Sawa |
| 3,976,730 A | 8/1976 | Cushing |
| 4,067,826 A | 1/1978 | Emery |
| 4,090,670 A | 5/1978 | Bennett |
| 4,098,463 A | 7/1978 | Lowry |
| 4,181,647 A | 1/1980 | Beach |
| 4,184,772 A | 1/1980 | Meyer |
| 4,250,222 A | 2/1981 | Mavel et al. |
| 4,367,190 A | 1/1983 | Beach |
| 4,511,091 A | 4/1985 | Vasco |
| 4,607,796 A | 8/1986 | Enikolopov et al. |
| 4,607,797 A | 8/1986 | Enikolopov et al. |
| 4,650,126 A | 3/1987 | Feder et al. |
| 4,708,617 A | 11/1987 | Herrington |
| 4,716,000 A | 12/1987 | Kerschbaum et al. |
| 4,772,430 A | 9/1988 | Sauda et al. |
| 4,875,847 A | 10/1989 | Wenger et al. |
| 4,890,996 A | 1/1990 | Shimizu |
| 4,917,834 A | 4/1990 | Hadermann et al. |
| 4,968,463 A | 11/1990 | Levasseur |
| 4,997,131 A | 3/1991 | Heren |
| 5,026,512 A | 6/1991 | Chang |
| 5,073,320 A | 12/1991 | Sterzel |
| 5,088,914 A | 2/1992 | Brambilla |
| 5,268,074 A | * 12/1993 | Brooks et al. ............. 162/191 |
| 5,395,065 A | 3/1995 | Hirose |
| 5,397,065 A | 3/1995 | Shutov et al. |
| 5,415,354 A | 5/1995 | Shutov et al. |
| 5,743,471 A | 4/1998 | Ivanov |
| 5,814,673 A | 9/1998 | Khait |
| 6,180,685 B1 | 1/2001 | Khait |

FOREIGN PATENT DOCUMENTS

| | | |
|---|---|---|
| DE | 4130315 | 1/1993 |
| EP | 0596835 | 5/1994 |
| EP | 08411479 | 5/1998 |
| GB | 1548978 | 7/1979 |
| SU | 1213612 | 11/1993 |
| WO | 9515819 | 6/1995 |

* cited by examiner

Primary Examiner—Mark Rosenbaum
(74) Attorney, Agent, or Firm—Liniak, Berenato & White, LLC (57) ABSTRACT

A method of making polymeric particulates wherein polymeric scrap material such as in the form of film waste is supplied to intermeshing pulverizer screws which are rotated to transport the polymeric material along their length and subject the polymeric material to solid state shear pulverization and in-situ polymer compatibilization. Uniform pulverized particulates are produced without addition of a pre-synthesized compatibilizing agent. The pulverized particulates are directly melt processable (as powder feedstock) and surprisingly yield a substantially homogeneous light color product. The polymeric film waste containing high proportions of LDPE yield molded articles of superior notched izod impact strength and elongation. Compatibilized polymeric particles can be formed even if the polymeric scrap material includes cellulose materials such as paper, cardboard and wood.

51 Claims, 1 Drawing Sheet

SOLID STATE SHEAR PULVERIZATION OF MULTICOMPONENT POLYMERIC WASTE

This application claims priority to U.S. Provisional Application, Serial No. 60/206,555, filed May 24, 2000.

FIELD OF THE INVENTION

The present invention relates to solid state shear pulverization of multi-component polymeric blends, including thermodynamically incompatible polymers, to form without compatibilizing agents pulverized particulates that are directly melt processable as powder feedstock to shaped articles of manufacture by conventional blow molding, rotational molding, extrusion, and spray coating techniques without color streaking in the resulting articles of manufacture. Importantly, polymer blends formed of unsorted, post-consumer and post-industrial plastic film waste can be formed by solid state shear pulverization into polymeric particulates having surprisingly high notched izod impact strength.

BACKGROUND OF THE INVENTION

Decreasing landfill space and rapidly rising disposal costs have forced many municipalities to begin curbside recycling of post-consumer plastic (polymeric) waste.

In 1997, municipal solid waste (MSW) generation in the U.S. totaled 217 million tons; plastics constituted 21.5 million tons, or 9.9 percent by weight of the total MSW generated, of which only 1.1 million tons have been recovered, (5.2% of generation). Plastics are a rapidly growing segment of MSW and are found in a wide variety of products, such as durable and non-durable goods, containers, packaging, furniture, etc. The resins used for these applications include high-density polyethylene (HDPE), low and linear-low density polyethylene (LDPE and LLDPE), polyethylene terephthalate (PET), polypropylene (PP), polystryene (PS), polyvinyl chloride (PVC), and others. Although most of the above resins are being recycled, the recovery level of HDPE and PET is substantially higher than the others.

Post-consumer polymeric waste, as opposed to industrial plastic waste, typically includes substantial quantities of plastic bottles, containers and packaging materials. Plastic bottles are molded of different polymeric materials depending upon the product they are to contain. For example, plastic bottles for water, milk, and household chemicals typically are made of high density polyethylene (HDPE), while soft drink bottles are typically made of polyethylene terephthalate (PET) with or without base caps made from high density polyethylene (HDPE). Generally, HDPE bottles account for approximately 50–60% and PET bottles account for approximately 20–30% of the bottles used by consumers. The balance of bottles, bottle caps and other containers used by consumers comprises other polymeric materials, such as low density polyethylene (LDPE), polypropylene (PP), polystyrene (PS), polyvinyl chloride (PVC), and other resins and multi-layered materials.

Plastic packaging materials also are made of a wide variety of polymers. For example, according to Plastics Compounding, Nov/Dec, 1992, the following polymers were used in packaging material in the %Us set forth: 27% LDPE, 21% HDPE, 16% PS, 16% PP, and 5% PET. Film waste in the U.S. in 1996 contained 15% HDPE, 68% LDPE, 13% PP, 2% PS AND 2% PVC according to an EPA update. Such film waste is formed from bags, packaging and shrink wrap films.

Post-industrial plastic waste can comprise polyolefins, PS, PET and other polymeric materials used for plastic packaging.

Currently, collection of plastic waste material exceeds the market demand for recycled plastic products as a result of the dearth of viable recycling technologies that are low cost and produce high quality recycled plastic products. One recycling approach has involved the high energy consuming batch grinding of commingled, unsorted mixed color plastic waste to form flake scrap material, melt processing and pelletizing the melt processed material to pellets, and extruding the pelletized plastic waste to form recycled plastic products. However, recycled plastic products made in this manner suffer from severe deficiencies that render the products unsatisfactory for many purposes and are of inferior, low value compared to products made of virgin polymeric materials. For example, these recycled plastic products exhibit inferior mechanical properties (e.g. tensile, flexural and notched izod impact strength) and inferior appearance in terms of color (dark brown or gray color) with streaking of colors within the molded product as a result of the chemical incompatibility of the different polymers present in the initial plastic waste stream and variations in the plastic waste stream composition over time.

A typical example of a low value, recycled plastic product is recycled plastic lumber having a dark brown or gray color with noticeable color streaking and inferior mechanical properties compared to components molded of virgin materials. As a result of the less than pleasing appearance, recycled plastic lumber is oftentimes painted to improve its appeal to the customer, or expensive pigments and other additives are added to the feedstock during the manufacturing process to this end. However, the cost of the recycled product is increased thereby.

Furthermore, certain melt processing techniques, such as blow molding, rotational molding, extrusion (e.g. extruded PVC pipe and profiles), and spray coating, require a plastic powder feedstock. That is, the flake scrap material is not directly melt processable to articles of manufacture by such powder feedstock-requiring melt processing techniques. To be useful as feedstock in such melt processing techniques, sorted or unsorted flake scrap material produced by batch grinding must be pelletized and then ground to powder form. The need to pelletize and grind sorted or unsorted flake scrap polymeric material prior to such melt processing adds considerably to the cost and complexity of recycling scrap plastics as well as the capital equipment expenditures required.

Currently used injection molding techniques require plastic pellets for high speed production of molded parts. Although unsorted, commingled flake scrap materials could be pelletized to provide feedstock for injection molding, the resultant molded products would suffer from the types of deficiencies discussed above attributable to polymer incompatibility.

So-called compatibilizing agents and/or reinforcing agents can be added to flake plastic scrap material comprising chemically incompatible polymers in attempts to produce a recycled plastic product exhibiting more desirable characteristics. However, addition of these agents to the plastic scrap material makes recycling more difficult and adds considerably to its cost. The Mavel et al. U.S. Pat. No. 4,250,222 relates to this type of recycling approach and is representative of the disadvantages associated with such an approach to plastic recycling. In general, while there are available compatibilizing agents capable of providing compatibilization of binary polymeric blends, such materials are specific for the blend desired and costly to make and use. Acceptable compatibilizers for polymeric blends of three or more components simply do not exist.

Attempts have been made to sort commingled, post-consumer plastic scrap to overcome the polymer incompatibility problems associated with the recycling of commingled plastic scrap. To-date, HDPE and PET are recovered from plastic waste streams by recycling technologies requiring sorting of the commingled plastic materials. Sorting can require use of costly techniques, such as video cameras, electronic devices, infrared detectors, and organic "markers", to provide effective segregation of like plastics. However, even sorted plastic waste can present problems in processing as a result of density and chemical differences among polymers falling in the same general class and made by different plastics manufacturers.

Further, sorted plastic scrap must be subjected to batch grinding to produce flake scrap material that then must be pelletized and ground again to provide powder feedstock for blow molding, rotational molding, some extruding, spray coating and other melt processing techniques that require powder feedstock.

The high cost of sorting has greatly limited widespread use of recycling approaches that require a sorting step. In particular, collected and sorted post-consumer plastic materials are usually more expensive than the corresponding virgin plastic materials. Thus, users of plastic materials are discouraged from using sorted, recycled plastic materials.

The plastics industry has dedicated significant technical and financial resources to increase plastics recycling from MSW. However, the properties of the discarded plastics are widely varied due to numerous suppliers, each of which use proprietary additive packages, fillers, and reinforcing agents. It has been established that it is not possible to control the consistency of the discarded feedstocks prior to recycling. Since mixed (commingled) plastics are incompatible with one another, their re-processing presents numerous challenges, including, but not limited to, a phase separation in the melt, delamination of molded parts, and inconsistent color, among others. Again, providing a compatibilizing agent to allow uniform blending of such diverse materials presents an insurmountable task, and, as of yet, such agents have not been made available.

In addition, the processing temperature of the plastics from MSW may differ by more than 100° C., which would lead to a degradation of temperature-sensitive polymers. The most well-known example is of mixtures containing PET and PVC where PET requires high processing temperature above 270°C.; however, at this temperature, PVC would degrade. If the same mixture is processed at 170° C., which is suitable for PVC, it would leave PET unmelted.

Because there is a limited use for mixed plastics waste, most of the discarded plastics are separated prior to reuse. The most common automated separation technologies are based on density difference, although manual sorting is still commonly used. The physical characteristics of the recycled material are sensitive to a change in composition and a presence of contaminants, such as labels, glue, adhesives, product residue, and dirt. For most applications of recycled plastics, a washing step would be an essential part of the reclamation process. After washing, single polymer streams are re-melted and re-pelletized for further re-use. Again, the sorting and washing procedures add costs which discourage wide spread recycling of plastics.

A new technology called Solid-State Shear Pulverization ($S^3P$), developed by the Polymer Technology Center at Northwestern University, converts multicolor, mixed (commingled) plastics into a homogenous, pastel color powder, which is melt processable by all existing plastics fabrication techniques. U.S. Pat. No. 5,814,673 issued to Khait describes the $S^3P$ process. The entire content of this mentioned patent is herein incorporated by reference. The patented solid state shear pulverization process is disclosed as useful for pulverizing a commingled, multi-component polymeric scrap. That this process is capable of providing polymeric particles having good physical properties, uniform color and compatibilization without the addition of a compatibilization agent regardless of the differences in the chemical and thermodynamic nature of the polymeric scrap, and all done in the solid state, represents a drastic leap forward in processing multi-component polymeric scrap for recycle as well as providing a unique method of blending scrap and/or virgin polymers. Heretofore blending of even two polymeric materials has required the addition of expensive, specifically prepared compatibilizing agents, property-improving additives or simply could not have been accomplished by previous melt-blending techniques. U.S. Pat. No. 5,814,673 includes numerous examples directed to solid state shear pulverization of multi-component plastic materials including high density polyethylene, low density polyethylene, polypropylene, polyethylene terephthalate, polystyrene and polyvinyl chloride. In all but two of the three or more component blends, H-PE was the majority component. In the other two blends, PET was the major component. In none of the examples described, is there a multi-component blend which is formed by the solid state shear pulverization process which yields a notched izod impact strength of greater than 1.0 ft.-lb./in. Thus, while improvement in compatibility between diverse polymers is certainly disclosed as well as forming a uniform colored polymeric powder from multi-component and multicolored polymer blends and further describing that the $S^3P$ blends have improved tensile strength, the patent does not otherwise disclose the blends which form the basis of this invention. One of such blends formed from film waste by the $S^3P$ process has surprisingly improved notched izod impact strength and elongation.

It is therefore an object of the invention to provide a method of processing multi-component polymeric materials, such as sorted or unsorted, commingled scrap polymeric material, by solid state pulverization to produce pulverized particulates (e.g. powder) that can be directly formed to shape by powder feedstock-using conventional melt processing techniques.

It is another object of the invention to provide a method of processing multi-component polymeric materials, such as sorted or unsorted, commingled scrap polymeric materials, having mixed colors by solid state pulverization to produce pulverized particulates that are melt processable to a substantially homogeneous light color without color streaking or marbleizing despite being produced from the mixed color scrap materials.

It is a further object of the present invention to provide a method of recycling commingled scrap multi-component polymeric materials without sortation and in a manner to achieve in-situ compatibilization of different polymers present and produce recycled polymeric particulates without the need for a compatibilizing agent.

It is still another object of the present invention to provide solid state pulverized polymeric particulates that are suitable as powder feedstock for melt processing by blow molding, rotational molding, some extruding, spray coating and other powder feedstock-using melt processing techniques.

It is still a further object of the invention to produce articles of manufacture, including molded parts and coatings, made from the aforementioned solid state pulverized polymeric particulates.

It is still yet another object of the invention to provide a method of processing multi-component polymeric materials in a manner to achieve in-situ compatibilization of a mixture of two or more incompatible polymers and provide homogenous polymer blends having high notched izod impact strength and/or elongation.

SUMMARY OF THE INVENTION

The present invention provides in one aspect a method of making polymeric particulates (e.g. powder) wherein sorted or unsorted, commingled multi-component polymeric scrap material, is supplied to pulverizer screw means rotated to transport the material along the length thereof and in the solid state convert the material to pulverized particulates (e.g. powder) that are melt processable directly by conventional blow molding, rotational molding, extrusion, spray coating and other melt processing techniques requiring a powder feedstock. This avoids the need for and costs associated with flake pelletizing and pellet grinding operations heretofore required.

The solid state pulverized particulates also are melt processable by conventional molding, extruding, spray coating and the like to form articles of manufacture having a substantially homogenous color appearance without color streaking or marbleizing. This color homogeneity is achievable regardless of whether the particulates include mixed color polymeric material of the same or different composition. This avoids the need for the addition of pigments and/or compatibilizing agents to the feedstock and the need to paint the molded or extruded product to hide unpleasing colors and color streaking.

The present invention provides in another aspect a method of making polymeric particulates wherein polymeric material, such as unsorted multi-component polymeric scrap material, comprising two or more thermodynamically incompatible polymers is supplied to pulverizer screw means rotated to transport the material along the length thereof and subject the material to solid state pulverization and in-situ polymer compatibilization. In-situ polymer compatibilization is evidenced, in one instance, by the resulting pulverized polymeric particulates exhibiting a thermogram different from that of the precursor unpulverized material. For example, the pulverized particulates of the invention exhibit a melting peak and/or crystallization peak quite different from those of the unpulverized material. Moreover, molded articles produced from the pulverized particulates of the invention exhibit increased tensile strengths and lack of delamination upon breaking in mechanical testing, this being a further indication of in-situ polymer compatibilization.

In an important aspect of this invention, multicomponent plastic scrap of a configuration equivalent to that found in municipal solid waste is converted to polymeric particulates by solid state shear pulverization. This scrap has as the major component LDPE. A polymeric particulate formed from a waste stream of multicomponent polymeric film which has undergone solid state shear pulverization can be molded into articles which exhibit extraordinary notched izod impact strength, including notched izod strengths of at least 5.0 ft.-lb./in. and/or exceptional elongation.

In practicing the present invention, the multi-component polymeric scrap material can include thermoplastics, polymer blends, polymer alloys, thermosets, elastomers and other polymeric materials. Typically, the polymeric material is comminuted to flake form by grinding, chopping or shredding using conventional equipment prior to pulverization. The pulverization process uses as scrap feedstock a material that is in a physical form (e.g. comminuted flakes) commonly available from scrap collections and municipal recycling centers.

The polymeric material is only subjected to limited frictional heating generated during the initial stage of the pulverization operation by engagement with the rotating screws. That is, solid state shear pulverization of the polymeric material preferably is conducted without heating of the material by any external pulverizer barrel heating device. Temperature control of the polymeric material during the pulverization operation is thereby facilitated to reduce degradation of the polymers and dye materials used with the feedstock polymers. Energy consumption during the pulverization operation also is reduced.

The present invention provides in still another aspect a method of making an article of manufacture having a substantially homogenous color from mixed-color polymeric material, such as sorted or unsorted, commingled polymeric scrap material. In this embodiment of the invention, mixed-color polymeric material of the same or different composition is supplied to pulverizer screw means rotated to transport the polymeric material along the length thereof to subject the material to solid state pulverization to form pulverized particulates. The pulverized particulates are molded, extruded or otherwise melt processed to form a substantially homogeneously colored shape characterized by the absence of color streaking and marbleizing, despite the particulates originating from mixed-color polymeric material. Typically, the pulverized powder is processable to a substantially homogenous pastel color tone corresponding to a dominant color of a particular scrap component in the feedstock.

The present invention also provides solid state pulverized particulates produced from scrap polymeric material wherein the particulates are suitable as powder feedstock, without conventional melt pelletizing and pellet grinding, for direct melt processing to shape using blow molding, rotational molding, some extrusion, spray coating, and other powder feedstock-using techniques.

The present invention further provides solid state pulverized polymeric particulates comprising three or more otherwise thermodynamically incompatible polymers produced from commingled, unsorted polymeric scrap materials. The polymers are in-situ compatibilized by solid state shear pulverization as evidenced by one or more different thermogram characteristics between recycled particulates of the invention and unpulverized polymeric material. Typically, the solid state pulverized particulates exhibit enhanced reactivity as compared to the unpulverized polymeric material.

Moreover, the present invention provides solid state pulverized polymeric particulates that exhibit, pulverized and as-melt processed, a substantially homogenous color despite being pulverized from mixed-color scrap material.

Articles of manufacture and powder coatings produced from the solid state pulverized particulates of the present invention exhibit mechanical properties generally superior to those exhibited by like processed flake polymeric material of the same composition depending on the polymer components involved. Notched izod impact strength substantially greater than even that expected from a mixture of compatible polymers coupled with excellent elongation and melt flow properties are achieved. Importantly, they also exhibit a substantially homogeneous color characterized by the absence of color streaking or marbleizing.

The present invention is advantageous in that the pulverized particulates are suitable for direct use as powder feedstock for powder feedstock-using conventional melt processing techniques by elimination of pelletizing and consequent pellet grinding operations. Moreover, commingled scrap polymer materials, virgin polymeric materials and mixtures thereof can be processed in a manner to achieve in-situ compatibilization of different polymers in a once-through pulverization operation without the need for a compatibilizing agent and without sortation in the case of commingled scrap feedstock. The pulverized particulates may be mixed with fillers, reinforcing agents, flame retardants, antioxidants and other additives commonly used in the plastics industry if desired.

The present invention can provide a high value, low cost recycled particulates product, as well as products molded or otherwise melt processed therefrom, thereby increasing utilization of available plastic scrap.

The aforementioned objects and advantages will become more readily apparent from the following detailed description and drawings.

DETAILED DESCRIPTION OF CERTAIN EMBODIMENTS OF THIS INVENTION

The present invention provides a method of making recycled polymeric particulates, such as powder, from post-consumer and/or post-industrial polymeric scrap material that may be sorted or unsorted, commingled so as to include two or more different scrap polymers.

Post-consumer polymeric waste typically includes substantial quantities of plastic bottles, containers and packaging materials made of different polymers. For example, plastic bottles for water, milk, and household chemicals typically are made of high density polyethylene (HDPE), while soft drink bottles are typically made of polyethylene terephthalate (PET) with or without base cups made of HDPE. Generally, HDPE bottles account for approximately 50–60% and PET bottles account for approximately 20–30% of the bottles used by consumers. The balance of bottles and other containers used by consumers comprise other polymeric materials, such as low density polyethylene (LDPE), polypropylene (PP), polystyrene (PS), polyvinyl chloride (PVC), and other resins and multi-layered materials.

Post-consumer polymeric waste also includes plastic packaging materials that are made of a wide variety of polymers including LDPE, HDPE, PS, PP, PET and others.

Post-industrial plastic waste can comprise polyolefins, PS, PET, and other polymeric materials used for plastic packaging.

Sorted polymeric scrap material typically comprises a single polymer composition collected from one or more sources and sorted pursuant to standard polymer codes now used on plastic bottles, containers and the like. Sorted polymeric scrap material typically includes scrap of different colors since to-date color sorting is not yet common.

Unsorted, commingled scrip material can include myriad types of polymeric scrap materials including, but not limited to, HDPE, LDPE, PP, PS, PET, PVC, PC (polycarbonate), ABS/PC (acrylonitrile butadiene styrene/polycarbonate), PPO (polyphenylene oxide)/PS and others. As disclosed herein, "LDPE" is meant to designate either low density polyethylene or linear low density polyethylene or mixtures thereof. In general, commingled, unsorted scrap can include thermoplastics, polymer blends, polymer alloys, thermosets, elastomers and other scrap polymeric materials.

Typically, unsorted, commingled scrap material will include mixtures of incompatible polymers such as mixtures of HDPE and PET, mixtures of HDPE and PS, mixtures of PP and PS, mixtures of HDPE, LDPE with PET and/or PS for purposes of illustration. Multi-component plastic scrap compositions in municipality waste include HDPE/LDPE/PP/PET/PS/PVC at 22/34/14/10/12/8, which represents the composition of all plastic waste in the U.S. in 1996; LDPE/PP/PS/PVC at 50/19/18/13, which represents all plastic waste without HDPE and PET which are increasingly being separated from plastic waste; and HDPE/LDPE/PP/PS/PVC at 15/68/13/2/2, which represents the composition of film waste in the U.S. in 1996 as shown in "Characterization of Municipal Solid Waste in the United States 1996 Update" EPA/530-R-97–015, May 1997. By mutually thermodynamically incompatible is meant that two or more polymers have different glass transition temperatures, Tg, and when processed by melt mixing, separate into distinct microscopic phases which are reflected in mechanical property deficiencies.

The presence of these incompatible polymers has rendered previous attempts at reclamation of unsorted, commingled scrap highly costly due to the need for sortation and/or addition of one or more of compatibilizing agents, reinforcing agents, fillers, and pigments and also ineffective in yielding a high value recycled product having aesthetic characteristics and mechanical properties approaching those achievable with virgin plastic material.

The commingled, unsorted plastic scrap typically will include polymeric scrap materials having various colors as a result of the wide variety of colorants used in the plastic bottling, container and other plastic industries.

Thermodynamic polymer incompatibility readily manifests itself in resulting molded polymeric products that are characterized by one or more of delamination, brittleness, and inconsistent mechanical properties from one molded part to the next. Moreover, parts molded from mutually incompatible, mixed-color polymers are typically characterized by inconsistent color from one molded part to the next and also by color streaking or marbleizing through the same molded part. These characteristics are observed regardless of whether the thermodynamically incompatible polymers are virgin materials or scrap polymer materials.

In accordance with a particular illustrative embodiment of the present invention, unsorted, commingled plastic scrap materials are solid state shear pulverized to produce recycled, polymeric particulates (e.g. powder) without the need for costly sortation, without the need for pelletization prior to use as feedstock in powder feedstock-using melt processing techniques, and in a manner to achieve in-situ compatibilization of thermodynamically incompatible polymers in a once-through pulverization operation that avoids the need to add a compatibilizing agent. Moreover, commingled, unsorted plastic scrap containing mixed-color scrap polymeric materials can be recycled without sortation to produce recycled, polymeric particulates (e.g., powder)

melt processable to substantially homogeneous light color articles of manufacture without the color streaking or marbleizing heretofore experienced with other recycling procedures. The solid state shear pulverization is as disclosed in aforementioned commonly assigned U.S. Pat. No. 5,814,673.

As used herein, the term color is intended to have a broad meaning to include usual color hues and white as well as transparent and translucent appearance.

In accordance with another illustrative embodiment of the present invention, unsorted, commingled plastic scrap materials having a distribution of polymers consistent with the distribution of plastic scrap in municipal waste in the U.S. are solid state shear pulverized to produce recycled polymeric particulates without the need for costly sortation, without the need for pelletizing prior to use as a feedstock in melt processing techniques, and in a manner to achieve in-situ compatibilization of thermodynamically incompatible polymers so as to avoid the need to add an expensive, especially synthesized compatibilizing agent. In this embodiment, commingled plastic scrap materials having a composition in which LDPE is the major component and the polymeric components are distributed (by wt. %) as follows can be solid state shear pulverized into compatible polymeric powder: (1) HDPE/LDPE/PP/PET/PS/PVC 10–30/30–50/10–20/5–15/5–20/4–15; (2) LDPE/PP/PS/PVC 40–60/12–25/10–25/10–20; and (3) HDPE/LDPE/PP/PS/PVC 5–25/50–75/5–25/0–10/0–10. While not necessary to the process of this invention, at least a portion of one or more of the plastic components can be replaced with its virgin polymer counterpart. Further, such compositions may contain up to 40%, typically 0.5–15% by wt. paper, cardboard, wood or other cellulosic materials which cannot readily be separated from the plastic scrap such as in the form of labels or other glued laminates with the plastic and can be effectively solid state shear pulverized with the plastic scrap materials and still form a uniform particulate composition in which the cellulosic component is intimately mixed or otherwise compatibilized with the plastic components. While some bond breakage of the cellulosic material during the pulverization process may result and subsequent reaction with polymeric fragments, it appears that the dominant mechanism during solid state pulverization is mixing wherein the cellulosic component is pulverized into minute particles which are uniformly mixed within the polymeric matrix. The pulverized cellulosic particles appear to have a diameter of about 1–100 microns, more typically about 10–75 microns. The small size of the pulverized cellulosic particles and the excellent dispersion of the pulverized cellulosic particles in the polymer matrix renders film made from pulverized scrap containing the cellulosic component transparent or translucent. Further, up to 2 wt.% each of other polymeric components are typically present in the plastic stream from MSW. The above waste streams represent (1) the composition of the major components of all plastic waste; (2) the composition of all plastic waste without HDPE and PET and (3) the composition of film waste, respectively. The latter composition typically formed from trash bags, grocery bags, cleaner bags, consumer article packaging and shrink wrap, etc. can be processed into powder by $S^3P$ and the powder directly molded into component parts which have extraordinary notched izod impact strength and elongation.

The recycled, polymeric pulverized particulates of the invention produced from sorted or unsorted, commingled scrap materials undergo chemical changes as characterized by DSC (differential scanning calorimetry) and ESR (electron spin resonance spectroscopy) which features are dramatically different from the those exhibited by unpulverized feedstock scrap material of the same composition. Moreover, molded components produced from the pulverized particulates of the invention generally exhibit increased tensile strengths, vastly improved notched izod impact strengths and lack of delamination upon breaking in mechanical testing depending upon the polymer components involved, these characteristics being indicative of in-situ polymer compatibilization.

In practicing the aforementioned illustrative embodiments of the present invention, polymeric scrap material is collected from several recycling centers (e.g. municipal recycling facilities commonly known as MRF's and/or industrial recycling centers). The collected scrap material may be unsorted and as a result will include two or more different polymers which may be thermodynamically incompatible. Moreover, scrap material collected from different centers typically will be at least partially intermixed with scrap material collected from other centers as a result of the usual collection, transportation, storage, and handling procedures for the scrap material prior to recycling. Unsorted, commingled scrap material can result from this situation.

The as-collected scrap material, whether of the sorted or unsorted, commingled type, typically is initially cleaned to remove unwanted contamination. Cleaning of the as-collected scrap material can be effected by water rinsing and/or cleaning solutions to remove contaminants, such as food residue, detergents, oil, and other contaminants. However, the need for and type of cleaning procedure used for initial cleaning of the as-collected scrap material will depend upon the degree and the type of contamination present on the scrap material. Relatively clean as-collected scrap material may not require any cleaning prior to pulverization.

Before or after cleaning, the as-collected, scrap material, whether of the sorted or unsorted, commingled type, initially is comminuted by grinding, chopping or shredding prior to pulverization to provide a polymeric scrap feedstock comprising flakes. The flakes typically have sharp, angular surfaces resulting from the comminution operation and usually have different colors with the number of colors present in the scrap feedstock depending upon the particular composition of the feedstock. The scrap flakes typically have sizes in the range of 0.10 to 0.30 inches for maximum width dimension and 0.02 to 0.06 inches for thickness dimension, although the as-collected scrap material can be comminuted to other flake sizes and shapes for solid state pulverization pursuant to the invention. A conventional scrap chopping machine of the grinder type can be used in practicing the invention, although other comminuting machines also can be used to this end.

Figure 1:
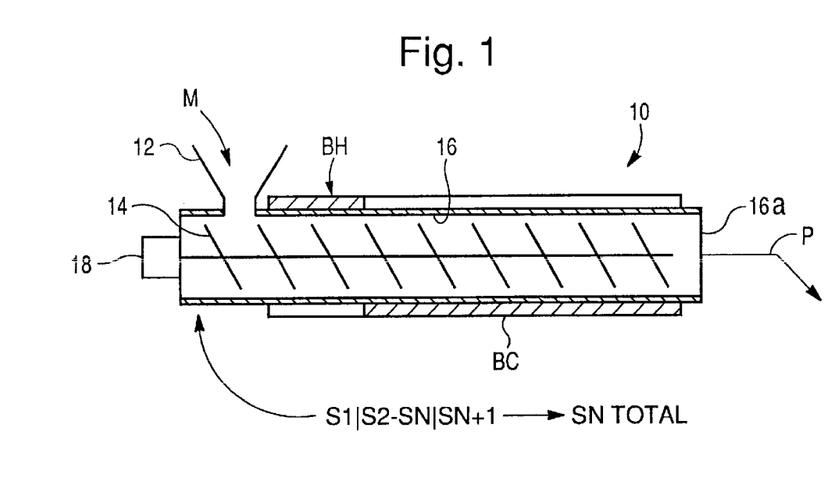
FIG. 1 is a schematic sectional view of a twin-screw pulverizer for practicing an embodiment of the invention.

The comminuted sorted or unsorted, commingled scrap flakes are supplied as feedstock M to a twin-screw pulverizer 10 shown schematically in FIG. 1 to effect solid state shear pulverization of the flake scrap material in accordance with the invention. Comminuted unsorted, commingled scrap material from different sources can be fed to the pulverizer as feedstock. Still further, comminuted unsorted, commingled scrap material from different sources can be fed to the pulverizer as distinct, sequential feedstocks. Alternately, comminuted flake scrap material that is sorted so as to have a single polymer composition or generic type (e.g. HDPE, PP, etc.) can be fed to the pulverizer as feedstock. The pulverizer 10 includes a feeder 12 for receiving the polymeric flake scrap feedstock M for transport by the twin-screws 14 (only one shown) through the pulverizer barrel zones Si-SN TOTAL where SN TOTAL corresponds to the total number of pulverizer zones. The first zone S1 is a material feed zone communicating directly with the feeder 12. Pulverizer barrel zones S2-SN each may be heated by external electric heater bands BH on the pulverizer barrel 16, depending on the composition and degree of crystallization of the scrap components being fed to the pulverizer. Zones S2–SN are followed by zones SN+1 to SN TOTAL that are cooled by coolant manifold bands or collars BC on the pulverizer barrel 16 (with the exception of certain barrel throttle zones not shown in FIG. 1 which are air cooled).

Preferably, the pulverizer barrel zones S2-SN are cooled by coolant bands similar to coolant bands BC followed by the aforementioned cooled downstream pulverizer zones SN+1-SN TOTAL such that only frictional heating of the scrap material occurs in the pulverizer. Use of the cooled pulverizer barrel zones S2–SN TOTAL is preferred to facilitate temperature control of the scrap material during the pulverization operation and to reduce degradation of the polymer and dye or colorant used with the polymers. Energy consumption during the pulverization operation also is reduced compared to conventional scrap batch grinding processes. Although coolant bands are described as shown in the figures, any type of cooling means capable of removing the heat of friction within the sheared plastic particles in the solid state can be used, including internal cooling of the pulverizer barrel. In FIG. 1, the flake scrap material feedstock M is supplied by the feeder 12 to the twin-screw pulverizer 10 having side-by-side, intermeshing, co-rotating screws 14 (only one shown in FIG. 1) in the extrusion barrel 16, although the invention generally envisions using one or more pulverizer screws to achieve solid state pulverization. The screws 14 are rotated in the same direction by drive motor 18 through a gearbox (not shown) to transport the scrap material along the length of the screws 14 and subject the scrap feedstock to temperature and pressure conditions for a given scrap feed rate effective to achieve solid state shear pulverization thereof (without melting of the polymers) and in-situ compatibilization of any thermodynamically incompatible polymers present in the scrap feedstock. The solid state pulverization does not involve melting of the polymeric scrap material in the feedstock but can involve softening of one or more of the polymers in the feedstock. Uniform pulverized polymeric particulates P (e.g. powder) are discharged at the open (dieless) discharge end 16a of the pulverizer barrel 16. The pulverized particulates P exhibit differential scanning calorimetry (DSC) and electron spin resonance spectroscopy (ESR) characteristics different from those exhibited by the unpulverized flake scrap feedstock M. Moreover, increased tensile strengths, increased notched izod impact strengths and lack of delamination upon breaking of testing specimens molded from the pulverized powder are further indication of in-situ polymer compatibilization. Details of the changes in particle morphology which take place in the pulverizer are given in aforementioned U.S. Pat. No. 5,814,673.

Any thermodynamically incompatible polymers present in the feedstock M are in-situ compatibilized during solid state shear pulverization in the pulverizer 10 as evidenced by production of pulverized polymeric particulates P at the discharge end of the pulverizer that exhibit DSC and ESR characteristics different from those of the unpulverized flake scrap feedstock M of the same composition. Moreover, the recycled particulates exhibit chemical changes (enhanced reactivity) as compared to the unpulverized flake scrap feedstock M as indicated by changes in the ESR spectra showing presence of free radicals.

In practicing the invention to achieve solid state shear pulverization of the scrap feedstock M in the manner described hereabove, the twin-screw pulverizer 10 can comprise for purposes of illustration and not limitation the Model PT-25, PT-40A or Model PT 60 twin-screws pulverizers (25, 40 and 60 mm inside diameter, respectively) manufactured by Berstorff GmbH, PO Box 610360, D-30603 Hannover 1 Germany. The above-mentioned co-rotating twin-screw pulverizers include twin, side-by-side intermeshing screws having a modular construction wherein each screw includes a series of standard screw elements mounted end-to-end in a selected sequence on a continuous screw shaft. The screw elements or stages include fluted transport elements, kneading or shearing elements, and spacer elements mounted in a selected sequence on the continuous shaft to accommodate variations in pulverization parameters and feedstock compositions, as necessary. In particular, the screws 14 can be modified by selection of appropriate transport elements, kneading or shearing elements, and spacer elements and their sequential arrangement and element lengths along the axis of the screw shaft.

Moreover, the named twin-screw pulverizers include a pulverizer barrel 16 having a modular construction wherein a series of standard barrel sections or zones are secured (e.g. bolted) together end-to-end to provide a continuous pulverizer barrel 16. The barrel sections can be adapted to have the electrical heating bands BH or the liquid cooling manifold bands BC mounted thereon for controlling temperature of the pulverized material, although other means of cooling can be used.

The PT-25, PT-40 and PT-60 twin-screw pulverizers are available from Berstorff, Germany. In addition, twin-screw pulverizers of this general type are described and shown in U.S. Pat. No. 4,607,797, the teachings of which are incorporated herein by reference. It is useful that the pulverizers handle a feed rate of at least 100 pounds per hour of plastic particles, chips or flakes or other comminuted form. A feed rate of at least 500 pounds per hour is preferred.

Figure 2:
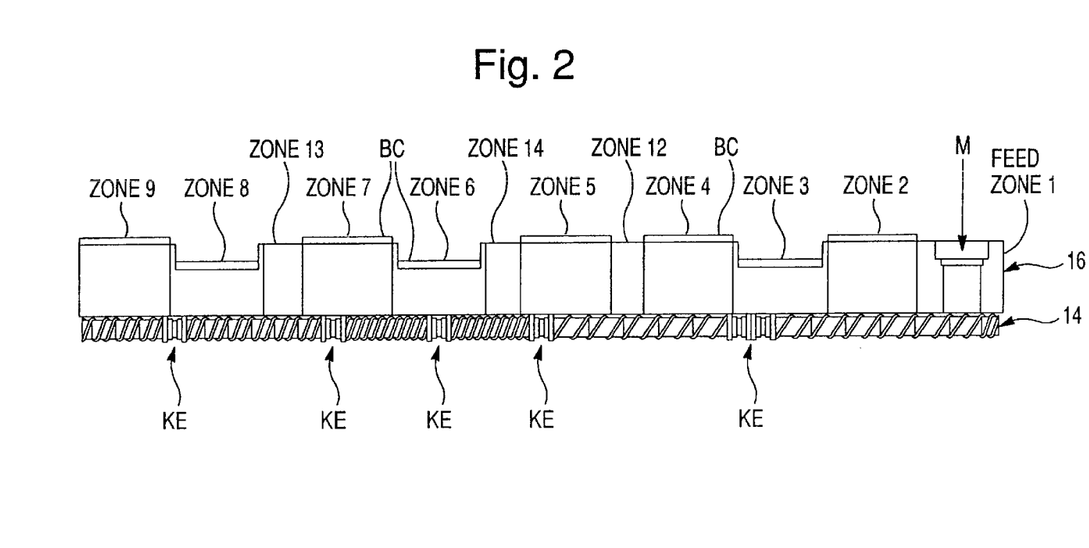
FIG. 2 is an elevational view of a representative screw used in practicing the invention when multi-component plastic scrap material is subjected to solid state shear pulverization in the pulverizer barrel (partially shown).

The invention is not to be construed as limited to the particular type or sequence of screw elements and barrel sections shown in FIG. 2 or the particular twin-screw pulverizer described. Pulverizer barrel and pulverizer screw configurations used in practicing the invention can be different from those shown and may depend upon the composition and degree of crystallization of scrap components of the feedstock M as well as other factors in order to achieve solid state shear pulverization and in-situ polymer compatibilization of the feedstock M to pulverized particulates in accordance with the invention.

The scrap feedstock M is subjected to solid state shear pulverization in the pulverizer 10 in a once-through operation by rotation of the twin-screws 14 in the same directions by motor 18 so as to transport the feedstock M along the length of the screws 14 and subject the feedstock M to temperature and pressure conditions (for a given feedstock feed rate through the pulverizer) effective to achieve solid state shear pulverization (without melting) of the flake-shaped scrap particulates and in-situ polymer compatibilization of thermodynamically incompatible polymers present in the feedstock M. The solid state pulverization avoids melting of the polymeric scrap material in the feedstock but can involve softening of one or more of the polymers in the feedstock.

With respect to the temperature parameter at a given feedstock feed rate, the feedstock M can be heated at the initial pulverizer barrel sections nearest the feed zone depending upon the composition of the feedstock M followed by cooling in all subsequent barrel zones of the pulverizer to maintain proper temperature control for solid state pulverization, in-situ polymer compatibilization, if necessary, and production of desired powder size.

Preferably, the scrap feedstock M is subjected to only limited frictional heat in barrel zones 2–4 by engagement with the rotating screws 14. That is, solid state pulverization of the scrap feedstock in barrel zones 2–4 is conducted without heating of the feedstock by external heater bands BH. Instead, all barrel zones 2–9, are cooled by coolant manifold barrels or collars BC or other means disposed in contact or communication with the pulverizer barrel. Pulverization occurs in cooled barrel zones where spaced kneading or shearing elements KE are located. This heatless pulverization (no melting) of the scrap feedstock M is advantageous to avoid heat degradation of the polymers and dyes (or other colorants) present with the polymers, which takes place during conventional melt extrusion. Energy consumption during the pulverization operation also is substantially reduced.

In general, the temperature of the scrap feedstock M is maintained at a level well below the melting temperature for crystalline polymers and below the Tg for amorphous polymers of the individual scrap components or constituents in the feedstock M at all barrel zones of the pulverizer 10 regardless of whether barrel zones 2–4 are heated or cooled. In this way, solid state shear pulverization can be conducted in the solid state at all stages of the pulverizer 10. The temperature of the feedstock M at each stage of the pulverizer 10 will depend on the screw configuration, RPM and the particular feedstock composition being pulverized.

For example, scrap feedstock temperatures to achieve solid state shear pulverization will also depend upon the ratio of various polymers in the feedstock M. In particular, the feedstock temperature is adjusted to accommodate a relatively high proportion of amorphous, polymeric material (e.g. PS) in the feedstock M. For high proportions (e.g. 70 weight %) of amorphous scrap materials, the temperature is lower as compared to the feedstock temperatures used to pulverize a feedstock M having a high proportion of crystalline scrap materials (e.g. PP). The feedstock temperature needed for solid state shear pulverization of the feedstock M to powder can be related to glass transition temperature (Tg) for amorphous polymers and/or melting temperature for crystalline polymers for particular feedstock compositions by suitable adjustment to heat output of barrel heater bands BH, if used, and to the coolant flow rate through the pulverizer coolant manifold bands BC.

With respect to the pulverization pressure and shear rate, the pressure and shear rate are controlled for a given screw design by the torque and rotational speed (RPM) of the motor 18 rotating the screws 14. The pressure and shear forces on the scrap feedstock M are effective for given feedstock temperatures and feed rates to achieve solid state shear pulverization of the flake-shaped scrap particulates in the manner described hereabove to achieve formation of the somewhat round powder and in-situ polymer compatibilization. The feedstock pressures and shear rates to achieve solid state shear pulverization will depend upon the ratio of various polymers in feedstock M. For high proportions (e.g. 70 weight %) of amorphous scrap materials, the energy consumption is higher as compared to the feedstock pressures used to pulverize a feedstock M having a high proportion of crystalline scrap materials. The feedstock pressures needed for solid state shear pulverization of the feedstock M to powder can be determined empirically for particular feedstock compositions by suitable adjustment to the torque and RPM of screw drive motor 16 at given feedstock temperatures.

The through-put (e.g. pounds per hour) of the scrap feedstock N through the pulverizer is controlled in conjunction with temperature and pressure to achieve solid state shear pulverization of the flake-shaped scrap particulates. The through-put for given feedstock temperature/pressure parameters needed for solid state shear pulverization of the feedstock N to fine powder can be determined empirically for particular feedstock compositions by suitable adjustment to the RPM of drive motor 16 for screws 14.

By proper selection of the pulverization temperatures, pressures, feed rate, screw configuration and RPM, pulverized polymeric particulates P (e.g. powder) are discharged at the open (dieless) discharge end 16a (i.e. open end without the usual extrusion die) of the pulverizer barrel 16. The particulates P typically are discharged onto a conventional endless conveyor (not shown) or other cooling/transport device, such as a spiral cooling device, capable of cooling powders and transporting powders to a storage location. During transport on the conveyor, the recycled pulverized powder can be allowed to cool to ambient temperature.

The recycled pulverized particulates P of the invention are made without the need for a compatibilizing agent despite the presence of two or more thermodynamically incompatible polymeric scrap materials in the initial feedstock M. Moreover, the recycled pulverized particulates P of the invention can be directly processed (i.e. without pelletization) by conventional rotational molding, blow molding, extrusion (extruded PVC pipe and profiles), spray coating and other melt processing techniques requiring powder feedstock. Further, the recycled particulates P exhibit enhanced reactivity as compared to the unpulverized scrap feedstock M as measured by ESR. If produced from mixed-color scrap feedstock M, the recycled polymeric particulates, pulverized and as-melt processed, exhibit a substantially homogeneous light pastel color based on a dominant color of a scrap component in the feedstock M, although a color adjustment can be made, if desired, by suitable pigment additive to the feedstock and/or pulverized particulates.

As the Examples below will illustrate, injection molded articles of manufacture produced from the recycled, pulverized particulates P of the present invention exhibit mechanical properties generally superior to those exhibited by like-molded flake scrap polymer feedstock of the same composition and also a substantially homogeneous color characterized by the absence of color streaking or marbleizing, despite the powder having originated from mixed-color scrap feedstock. The homogenous color of molded articles produced from the pulverized particulates is quite surprising and unexpected given the mixed-color nature of the initial feedstock M. Further, articles formed from a mixture of incompatible polymers processed in accordance with this invention have exceptionally high notched izod impact strength as well as excellent elongation and melt flow. The Examples set forth herebelow illustrate these advantageous features of the invention.

Importantly, the recycled, pulverized particulates P of the invention can be used in molding a plurality of articles that exhibit substantially the same homogeneous pastel color from one molded article to the next as illustrated in the following Examples. In contrast, a mixture of flake scrap of like composition and mixed color produce molded articles exhibiting inconsistent colors from one molded article to the next.

The recycled particulates P of the invention also can be used in conventional coating procedures wherein powdered coating feedstock is used. For example, the recycled powder can be used as feedstock in coating processes, such as thermal spray, to produce homogeneously colored, thin coatings on various substrates.

EXAMPLES 1–4 AND 5–9

All plastics used in these examples were derived from discarded products of unknown origin. HDPE, PP, PET, PS and PVC were received in a flake form from several recyclers. LDPE was the only plastic obtained from a post-industrial source. Several blends were created to simulate typical multicomponent plastics configurations found at municipal recycling facilities based on a 1997 EPA report. Three dry-blended compositions were solid state shear pulverized: (1) HDPE/LDPE/PP/PET/PS/PVC at 22/34/14/10/12/8 (wt. %), (2) LDPE/PP/PS/PVC at 50/19/18/13 (wt. %), and (3) HDPE/LDPE/PP/PS/PVC at 15/68/13/2/2 (wt. %). All blends had been dry-blended and processed in the solid state with a laboratory scale, PT-25 co-rotating intermeshing, self wiping, twin-screw pulverizer built by Berstorff, Germany. The pulverizer used had a modular screw design that consisted of a plurality of elements, such as mixing, conveying and kneading (shearing) blocks as previously described. For Examples 1–3, high shear designs were used to achieve the necessary intimate mixing of ordinarily incompatible post-consumer feedstocks without the use of premade compatibilizing agents. The high shear design of the pulverizer includes a screw with an outside diameter the same as the inside diameter of the barrel of the pulverizer. Processing parameters, such as RPM, temperature and feed rate also govern the pulverization process. In order to maintain polymers in the solid state (without melting), it is important to effectively remove the frictional heat generated during the pulverization process. This was done using a barrel design that allows for intensive cooling. The individual polymers in flake form were also solid state shear pulverized using the Berstorff PT-25 pulverizer.

The powders made by solid state shear pulverization ($S^3P$) were directly injection molded (without prior pelletization) into test bars, using a 1 oz. Battenfeld injection molding machine with a 22 ton clamping pressure. Key physical properties were tested in accordance with ASTM D638 (tensile strength and elongation), ASTM D258 (notched izod impact strength), ASTM D790 (flexural strength and flexural modules), ASTM D468 (heat deflection temperature), and ASTM D1238 (melt flow rate).

RESULTS

Key physical properties of the dry-blended commingled pulverized materials from the PT-25 pulverizer are shown in Table 1. The five-component blend (3) of HDPE/LDPE/PP/PS/PVC at a 15/68/13/2/2 ratio, with a multiplicity of colors, (including white, gray, clear, black, peach, blue, red and yellow) had a pastel green color after pulverization. This color was a result of the intimate mixing inherent to the pulverization process. The most impressive results were obtained from the multi-color, five-component blend (3), that represents the makeup of a post-consumer film waste stream. The elongation at break and the notched izod impact strength of the five-component blend (3) showed a significant increase over that of the individual components, see Table 2.

TABLE 1

Physical properties of dry-blended commingled post-consumer plastics after $S^3P$ processing on PT-25 pulverizer and melt mixing on ZE-25 pulverizer

| Ex. | MATERIAL/ RATIO | TENSILE PROPERTIES[1] YIELD MPa [PSI] | ULTIMATE Mpa [PSI] | % ELONG | NOTCHED IZOD IMPACT J/M [Ft-lb/In] | FLEXURAL PROPERTIES MODULUS Mpa [PSI] | STRENGTH Mpa [PSI] | HDT ° C., 264 psi | MFR[2] G/10 min |
|---|---|---|---|---|---|---|---|---|---|
| (1) | LDPE/PP/PS/PVC* 50/19/18/13 | — | 21.6 [3140] | 15 | 27 [0.5] | 945 [137000] | 30.4 [4410] | 64 | 1.9 |
| (2) | HDPE/LDPE/PP/PET/PS/PVC* 22/34/14/10/12/8 | — | 18.9 [2740] | 9 | 21 [0.4] | 945 [137000] | 27.4 [3980] | 53 | 2.6 |
| (3) | HDPE/LDPE/PP/PS/PVC* 15/68/13/2/2 | 15.5 [2250] | 18.7 [2710] | 510 | 230 [4.3] | 502 [72800] | 17.1 [2480] | 41 | 1.1 |
| (4) | HDPE/LDPE/PP/PS/PVC 15/68/13/2/2 ZE-25 Melt Mix | 16.5 [2390] | 16.2 [2350] | 245 | 320 [5.9] | 436 [63300] | 16.5 [2400] | 40 | 1.4 |

*$S^3P$ processed on PT-25
[1] = Pull rate of 2 in./minute
[2] = MFR at 190 ° C., 2.16 kg

TABLE 2

Physical properties of individual components after
S³P processing on PT-25 pulverizer

| Ex. | MATERIAL/ RATIO | TENSILE PROPERTIES[1] | | | NOTCHED IZOD | FLEXURAL PROPERTIES | | HDT | |
|---|---|---|---|---|---|---|---|---|---|
| | | YIELD MPa [PSI] | ULTIMATE Mpa [PSI] | % ELONG | IMPACT J/M [Ft-lb/In] | MODULUS Mpa [PSI] | STRENGTH Mpa [PSI] | °C., 264 psi | MFR[2] G/10 min |
| (5) | HDPE | 23.0 [3340] | 16.8 [2440] | 470 | 170 [3.2] | 717 [104000] | 21.9 [3180] | 41 | 0.8 |
| (6) | LDPE | 13.9 [2010] | 15.9 [2310] | 130 | 630 [11.7] | 308 [44700] | 13.2 [1920] | 38 | 0.4 |
| (7) | PP | 26.5 [3840] | 21.1 [3060] | 700 | 32 [0.6] | 772 [112000] | 31.5 [4570] | 50 | 15.7 |
| (8) | PS | — | 40.1 [5810] | 5 | 11 [0.2] | 3120 [45300] | 55.6 [8060] | 79 | 4.3 |
| (9) | PET | — | 53.6 [7770] | 8 | 32 [0.6] | 2210 [321000] | 730.8 [10600] | 62 | N/A |

[1]= Pull rate of 2 in./minute
[2]= MFR at 190° C., 2.16 kg

It is important to compare properties of an S²P-made five-component mixture with those of melt-mixed blends using a conventional twin-screw co-rotating ZE-25 Berstorff pulverizer (Table 1). A striking increase in elongation for S³P-made material vs. conventionally melt-mixed material has been observed (510% vs. 245%). The tensile strength was also higher for the five-component S³P-made material as compared to the same material after melt-mixing (2710 psi vs. 2350 psi).

Due to the intense shearing forces inherent to S³P, the particles produced have an elongated morphology, which can be seen by scanning electron microscopy (SEM). With SEM, differences in the morphology of blend (3) produced on the PT-25 pulverizer are visible.

In spite of wide variations in the melt flow rates of the individual components of the HDPE/LDPE/PP/PS/PVC 15/68/13/2/2 blend (including injection molding, extrusion and blow molding grades), a uniform S³P-made material with melt flow rate of 1.1 g/10 min. was successfully injection molded into parts at a commercial facility. This injection molding trial was performed to demonstrate that a S³P-made blend could be used in currently existing part manufacturing processes, without any modifications to the mold or to the processing parameters. A Niigata injection molding machine with a 12 oz. shot at G.A.I.M. Engineering, Bensenville, Ill. was used to mold textured taping knives with metal inserts. All of the parts made had good surface appearance and uniform color.

EXAMPLES 10–12

The following examples involved the use of a production scale Ultra Torque® pulverizer PT-60 (60 mm in diameter) built and installed by Berstorff. It was found that due to an improved design of the larger pulverizer and higher torque available, even better mixing of multicomponent blends was possible, as compared with the laboratory scale PT-25 pulverizer. The same five-component, post-consumer, multicolor (at least eight colors) mixture (HDPE/LDPE/PP/PS/PVC 15/68/13/2/2) that was made on a laboratory scale, was pulverized with the PT-60 pulverizer into a homogenous yellow-green powder. This blend was dry-blended at a commercial blender, Major-Prime Plastics of Villa Park, Ill., in a 1000 lb. quantity. Key physical properties of the pre-blended S³P-made and conventionally melt mixed materials are shown in Table 3. These properties can be compared to the earlier dry-blended mix, seen in Table 1. The 1000 lb. quantity of the five-component blend lo of HDPE/LDPE/PP/PS/PVC at a 15/68/13/2/2 ratio, exhibited exceptionally high notched izod impact of 10.4 ft.-lb./in. This was higher than 6.8 ft.-lb./in. measured for this S³P-made material produced on a laboratory PT-25 pulverizer; and it was almost twice that of the melt-mixed material produced on a conventional twin-screw extruder. However, the elongation at break was lower than that of the small dry-blended batch previously run on the PT-25 pulverizer (Table 1). The difference in properties produced on a large and a small scale could be explained by a much higher portion of homopolymer HDPE (from dairy bottles) in the pre-blended mixture used for large-scale work. The increase in homopolymer content is believed to have caused the lower elongation at break, but higher notched izod impact strength, as compared with those of the blend containing a higher portion of copolymer HDPE (Table 1). What the Examples illustrate is that a mixture of incompatible polymers, in particular, a mixture of film waste scrap, can be solid state pulverized in accordance with this invention to yield a compatibilized polymeric powder having a notched izod impact strength of at least 5.0 ft. lb./in., more typically, at least 8.0 ft. lb./in. with an elongation of at least 100% and above. Such physical properties have not been achieved by melt mixing. It is also important to again point out that the compatibilized powders of this invention are formed without the aid of compatibilzing agents.

TABLE 3

Physical properties of pre-blended commingled plastic waste after S³P on laboratory- (PT-25) and commercial-scale (PT-60) equipment and melt mixing

| Ex. | MATERIAL/RATIO | TENSILE PROPERTIES[1] | | NOTCHED IZOD | FLEXURAL PROPERTIES | | HDT | |
|---|---|---|---|---|---|---|---|---|
| | | ULTIMATE MPa [PSI] | % ELONG | IMPACT J/M [Ft-lb/In] | MODULUS Mpa [PSI] | STRENGTH Mpa [PSI] | °C., 264 psi | MFR[2] G/10 min |
| (10) | HDPE/LDPE/PP/PS/ PVC (15/68/13/2/2) S³P PT-60 | 16.7 [2425] | 144 | 556 [10.4] | 461 [66850] | 15.6 [2259] | 41 | 0.9 |
| (11) | HDPE/LDPE/PP/PS/ PVC (15/68/13/2/2) S³P PT-25 | 17.0 [2459] | 220 | 364 [6.8] | 467 [67694] | 17.2 [2490] | 41 | 0.9 |
| (12) | HDPE/LDPE/PP/PS/ PVC (15/68/13/2/2) ZE-25 Melt Mix | 14.7 [2131] | 157 | 246 [4.6] | 431 [62658] | 16.1 [2330] | 40 | 1.8 |

[1]=Pull rate of 2 in./min
[2]=MFR at 190 °C., 2.16 kg

EXAMPLES 13 and 14

In these Examples, two formulations containing multi-component plastic scrap, as well as paper and wood, were pulverized under solid state shear pulverization in accordance with the present invention to determine if a compatibilized polymeric powder could be formed. The pulverization was conducted on the PT-25 pulverizer under high shear conditions, such as described above. The powders that were formed were directly injection molded into test bars using the 1 oz. Battenfeld injection molding machine. Key physical properties were tested in accordance with ASTM Standards. The compositions and the properties of the molded test bars which were formed from the pulverized materials are set forth in Table 4 below.

TABLE 4

| Material | Tensile Properties[1] | | | | | | IZOD IMPACT | | MFR[2] |
|---|---|---|---|---|---|---|---|---|---|
| | Yield [PSI] | STD DEV | ULTI. [PSI] | STD DEV | % ELONG | STD DEV | FT-LB/IN | STD DEV | g/10 min |
| PE/PP/PS/Paper and wood 75/15/5/5 | — | — | 2075 | 39 | 130 | 19 | — | — | 0.6 |
| PE/PP/PS/Paper and wood 80/12/2/6 | — | — | 2170 | 66 | 131 | 16 | 9.2 | 0.9 | 0.4 |

[1]=Pull rate of 2 in./min.
[2]=MFR at 190° C., 2.16 kg

The pulverized powder, which was formed was of uniform color and, upon testing, yielded properties suitable for blow molding. Accordingly, it can be seen that the solid state shear pulverization process can yield compatibilized polymeric product from a mixture of incompatibile thermoplastic resins and cellulosic scrap. No compatibilizing agents were incorporated in the blends and, in fact, there is no compatibilizing agent or agents which are known for the above-type of mixtures shown in Examples 13 and 14.

In a further test, the formulation of Example 13 was compression molded into a thin film at 200° C., and 8 tons of pressure which was held for 2 minutes. The film which was formed was translucent. Minute particles, presumably cellulosic particles, can barely be seen in the film. Such particles, however, do not degrade the transparency of the film which has been formed. It is speculated that the paper and wood incorporated into the scrap mix are pulverized into particles of nanometer size, on the order of the size of wavelengths of the visible spectrum and smaller. The cellulosic particles are uniformly mixed within the polymeric matrix and remain only barely visible, if at all, so as not to degrade the transparency of the film.

We claim:

1. A method of preparing polymeric material comprising the steps of:

(a) providing a mixture of chemically distinct polymeric materials in the solid state, said mixture consisting essentially of film waste and containing at least three chemically distinct polymeric materials and cellulosic material intimately bonded to at least a portion of said polymeric materials, and wherein low density polyethylene (LDPE) is present as the major component of said mixture;

(b) effecting a chemical change to said mixture by application of mechanical energy through solid state shear pulverization in the presence of cooling to maintain the polymeric materials in the mixture in the solid state during said change and thereby compatibilizing the mixture to form homogenous material upon effecting said chemical change; and (c) discharging the resulting compatibilized polymeric material.

2. The method of claim 1, wherein said mixture is provided in the form of chips, particles or flakes.

3. The method of claim 2, wherein said mixture is provided at a rate of at least about 100 lbs. per hour.

4. The method of claim 1, wherein said polymeric material is discharged in the form of a powder.

5. The method of claim 4, further comprising the steps of: (d) applying the powder of said polymeric material as a coating.

6. The method of claim 5, wherein said polymeric material is applied as a powder coating.

7. The method of claim 1, wherein the step of effecting a chemical change is effected by co-rotating, mechanical screws.

8. The method of claim 1, wherein said film waste comprises at least 50 wt. % LDPE.

9. The method of claim 1, wherein said film waste comprises HDPE/LDPE/PP/PS/PVC in amounts of 5–25/50–75/5–25/0–10/0–10 percent by wt.

10. The method of claim 1, wherein said mixture further contains 0–40 wt. % cellulosic material.

11. The method of claim 10, wherein said cellulosic material is intimately bonded to said polymeric materials forming said mixture.

12. The method of claim 10, wherein said mixture contains 0.5–15 wt. % of said cellulosic material.

13. The method of claim 10, wherein said cellulosic material comprises paper, cardboard, wood, or mixture thereof.

14. The method of claim 2, wherein said chips, particles, or flakes are formed by comminution of polymeric waste.

15. The method of claim 14, wherein said plastic waste is a mixture of commingled, unsorted polymeric material, so as to form said mixture.

16. The method of claim 1, wherein said mixture contains low density polyethylene (LDPE) as the major component and at least two polymeric materials selected from the group consisting of high density polyethylene (HDPE), polypropylene (PP), polyethylene terephthalate (PET), polystyrene (PS) and polyvinyl chloride (PVC).

17. The method of claim 16, wherein said mixture contains as a major component LDPE, and additionally each of HDPE, PP, PET, PS and PVC.

18. The method of claim 17, wherein said mixture comprises HDPE/LDPE/PP/PET/PS/PVC in amounts of 10–30/30–50/10–20/5–15/5–20/4–15 percent by wt.

19. The method of claim 16, wherein said mixture comprises LDPE as the major component and at least two additional polymeric materials selected from the group consisting of polypropylene, polystyrene and polyvinyl chloride.

20. The method of claim 19, wherein said mixture is substantially devoid of high density polyethylene and polyethylene terephthalate.

21. The method of claim 19, wherein said mixture comprises LDPE/PP/PS/PVC in amounts of 40–60/12–25/10–25/10–20 percent by wt.

22. The method of claim 16, wherein said mixture may contain up to 2% by wt. each of additional polymeric materials.

23. The method of claim 16, wherein said polymeric material is discharged as a powder.

24. The method of claim 1, wherein said polymeric material is discharged as a powder.

25. The method of claim 1, further comprising the steps of: (d) melting said discharged polymeric material; and (e) shaping said melted polymeric material by molding, extrusion or spray coating.

26. The method of claim 25, wherein said melted polymeric material is shaped by injection molding, extrusion or blow molding.

27. The method of claim 1, wherein said solid state shear pulverization is applied in the absence of a compatibilizing agent.

28. The method of claim 1, wherein said mixture is provided in the form of chips, particles or flakes.

29. The method of claim 28, wherein said mixture is provided at a rate of at least about 100 lbs. per hour.

30. A method of preparing polymeric material comprising the steps of:

(a) providing a mixture of chemically distinct polymeric materials in the solid state consisting essentially of film waste;

(b) effecting a chemical change to said mixture by application of mechanical energy through solid state shear pulverization in the presence of cooling to maintain the polymeric materials in the mixture in the solid state during said change and thereby compatibilizing the mixture to form homogenous material upon effecting said chemical change; and (c) discharging the resulting compatibilized polymeric material, wherein articles molded from said compatibilized polymeric materials have a notched izod impact strength of at least 5.0 ft. lb./in.

31. The method of claim 30, wherein articles molded from said compatibilized polymeric material have a notched izod impact strength of at least 8.0 ft. lb./in.

32. The method of claim 30, wherein articles molded from said compatibilized polymeric material have an elongation of at least 100%.

33. The method of claim 30, wherein said mixture contains at least 50 wt. % LDPE.

34. The method of claim 30, wherein said mixture is provided in the form of chips, particles or flakes.

35. The method of claim 34, wherein said mixture is provided at a rate of at least about 100 lbs. per hour.

36. The method of claim 34, wherein said chips, particles or flakes are formed by comminution of said film waste.

37. The method of claim 30, wherein said compatibilizied polymeric material is discharged in the form of a powder.

38. The method of claim 30, wherein the step of effecting a chemical change is effected by co-rotating mechanical screws.

39. The method of claim 30, wherein the step of effecting a chemical change is effected in the absence of a compatibilizing agent.

40. A method of preparing polymeric material comprising the steps of:

(a) providing a mixture of at least one polymeric material and cellulosic material in the solid state;

(b) effecting compatibilization of said mixture by application of mechanical energy through solid state shear pulverization in the presence of cooling to maintain the materials in the mixture in the solid state during said change, thereby compatibilizing the mixture to form homogenous material; and (c) discharging the resulting compatibilized polymeric material.

41. The method of claim 40, wherein said mixture contains 0.5 to 40% by wt. cellulosic material.

42. The method of claim 40, wherein said cellulosic material comprises paper, cardboard, wood or mixture thereof.

43. The method of claim 40, wherein at least a portion of said cellulosic material is intimately bonded to said polymeric material forming said mixture.

44. The method of claim 40, wherein said polymeric material is selected from the group consisting of HDPE, LDPE, PP, PET, PS, PVC and mixtures thereof.

45. The method of claim 44, wherein said mixture contains at least two of said polymeric materials.

46. The method of claim 45, wherein said polymeric material is a mixture of commingled, unsorted polymeric waste.

47. The method of claim 40, wherein said mixture is provided in the form of chips, particles or flakes.

48. The method of claim 40, wherein said polymeric material is discharged in the form of a powder.

49. The method of claim 40, wherein the step of effecting a chemical change is effected by co-rotating mechanical screws.

50. The method of claim 40, wherein the step of effecting a chemical change is effected in the absence of a compatibilizing agent.

51. The method of claim 40, wherein said mixture is provided at a rate of at least about 100 lbs. per hour.

* * * * *